United States Patent [19]

Liu

[11] Patent Number: 5,105,150
[45] Date of Patent: Apr. 14, 1992

[54] WIDE-BAND PROGRAMMABLE TACHOMETER AND SPEEDOMETER/ODOMETER APPARATUS

[76] Inventor: Paul Liu, No. 331, Sec. 1, Wan Shou Rd., Kuei Shan Hsiang, Tao Yuan Hsien, Taiwan

[21] Appl. No.: 680,067

[22] Filed: Apr. 3, 1991

Related U.S. Application Data

[63] Continuation-in-part of Ser. No. 372,849, Jun. 29, 1989, abandoned.

[51] Int. Cl.$^5$ ............................................. G01P 3/44
[52] U.S. Cl. ................................................. 324/160
[58] Field of Search ............ 324/161, 162, 163, 166, 324/176, 177, 115, 207.11, 207.12, 207.14, 207.23; 364/130, 131, 154, 514, 550, 556, 561, 565, 566, 569, 571.01; 340/870.16

[56] References Cited

U.S. PATENT DOCUMENTS

| | | | |
|---|---|---|---|
| 4,167,699 | 9/1979 | Baker | 324/166 X |
| 4,383,303 | 5/1983 | Hoffman | 324/166 X |
| 4,434,470 | 2/1984 | Thomas et al. | 324/166 X |
| 4,742,297 | 5/1988 | Heaton et al. | 324/166 |
| 4,939,675 | 7/1980 | Luitje | 324/166 X |

Primary Examiner—Kenneth A. Wieder
Assistant Examiner—Warren S. Edmonds
Attorney, Agent, or Firm—Staas & Halsey

[57] ABSTRACT

A wide-band programmable tachometer and speedometer/odometer apparatus to detect the rotational speed of an output shaft of an engine in a vehicle and calculate the corresponding speed/mileage thereof. First, a converting device converts a mechanical motion of an engine into an electrical signal. Second, the electrical signal is amplified by two amplifiers and outputted as an amplified signal. Third, the amplified signal is sent to a frequency divider and then through a multiplexer. A selecting device is incorporated with the multiplexer to send out a signal with frequency in an operable range. An F-V converter is used to convert the signal from the multiplexer and to output a first, a second, and a third DC voltage. The second and the third DC voltages are used to drive a tachometer to display the rpm of an engine. The third DC voltage is sent to a V-F converter and through a monostable circuit unit and outputted as positive pulses. The positive pulses are sent to an speedometer/odometer counter to obtain a corresponding mileage.

7 Claims, 5 Drawing Sheets

WIDE-BAND PROGRAMMABLE TACHOMETER AND SPEEDOMETER/ODOMETER APPARATUS

This application is a continuation-in-part of application Ser. No. 07/372,849, filed June 29, 1989, now abandoned, which is hereby incorporated by reference.

BACKGROUND OF THE INVENTION

The present invention relates to a wide-band programmable tachometer, and speedometer/odometer apparatus (hereinafter will be referred to as only the meter) to detect the rotational speed of an output shaft of an engine in a vehicle and to calculate the corresponding speed/mileage thereof. More particularly, the present invention relates to a tachometer which is adapted to indicate an extremely wide range of rotational speeds of an engine, ranging from the hundreds of rpm's (revolutions per minute) of an automobile to the hundreds of thousands of rpm's of an airplane.

Referring to FIG. 1, in conventional tachometers 100, a converting means 110, which converts a mechanical motion of an engine into an electrical signal, is connected to an actuating means 120 with a first microadjustment selecting means 121. The rpm value of the engine is shown on the dial of a display means 130 driven by the actuating means 120 after the electrical signal is processed therein. The frequency of the electrical signals sent into the currently available actuating circuit 120 are limited within an appropriate operable range; for example, they could be from 133 Hz to 265 Hz for a low-frequency actuating circuit 120. Therefore, various kinds of tachometer 100 are required to adapt to the different ranges of operating speeds of engines for automobiles, airplanes, and other machines. As a result, the tachometers for high frequency (about 1.2 kHz to 19.9 kHz) and low frequency (133 Hz to 1,248 Hz) are developed to be respectively employed to meet different requirements.

There are several methods to convert the motion of an engine into an electrical signal which corresponds to the rotating speed of the engine, and can therefore be used to indicate the rotating speed, for example, by way of pulse generator-type sender, magnetic proximity, alternator-type sender, or standard ignition coil. The first micro-adjustment selecting means 121 comprises a plurality of (for example, six) switches to selectively suit the different ranges of frequency response of the actuating circuit 120 with respect to the electrical signals, wherein the ON/OFF states of the six switches give $2^6$ (64) combinations. With the 64 combinations, the operating range for the frequency range within 133 Hz to 265 Hz can be divided into 64 different periods, in which each period has the range of $(165-133)/64=2.06$ Hz. It should be noted that the ON/OFF states of the switches for the micro-adjustment selecting means 120, which is pre-set before the tachometer 100 is fabricated, are obtained by calculating a full-scale frequency of the electrical signal. Based on the full-scale frequency of the electrical signal, the scale on the dial of the display means is adjusted before the tachometer 100 is fabricated.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide a tachometer which is adapted to indicate an extremely wide range of rotational speeds, ranging from the hundreds of rpm's of an automobile to the hundreds of thousands of rpm's of an airplane.

Another objective of this invention is to provide a tachometer which has performance characteristics superior to any previous tachometer.

It is still another objective of this invention to provide an speedometer/odometer which is adapted to be incorporated with the tachometer and indicate the speed/mileage corresponding to the speed of the engine.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
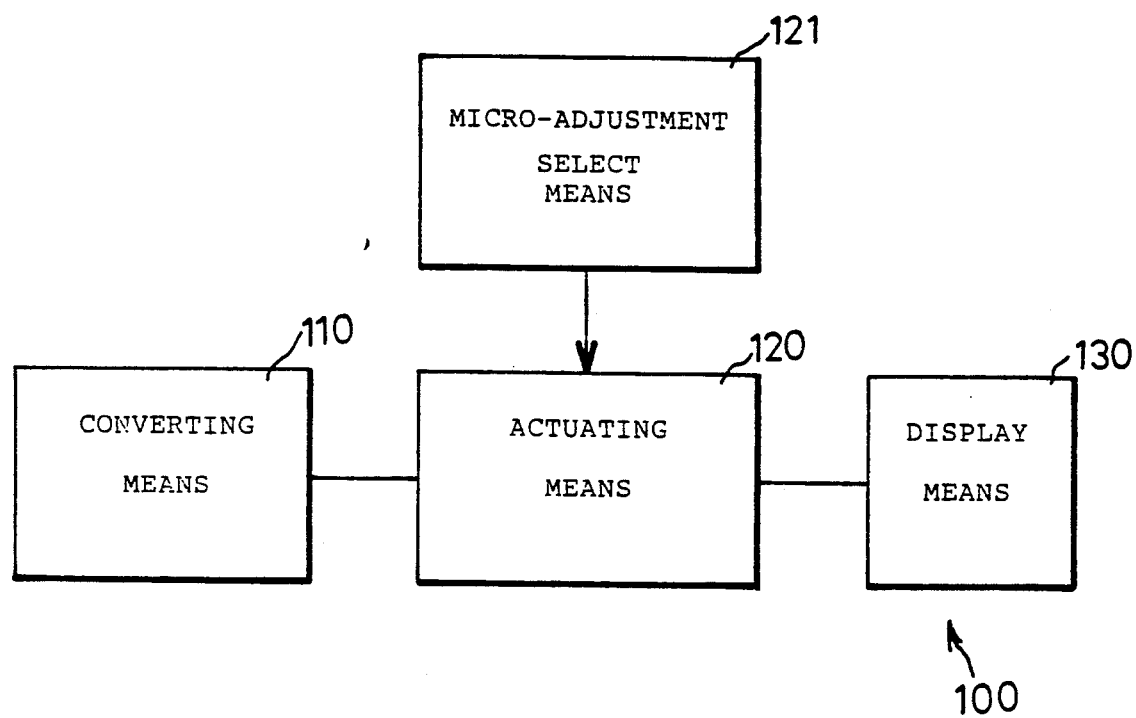
FIG. 1 is a block diagram of a conventional tachometer according to prior art.
Figure 2:
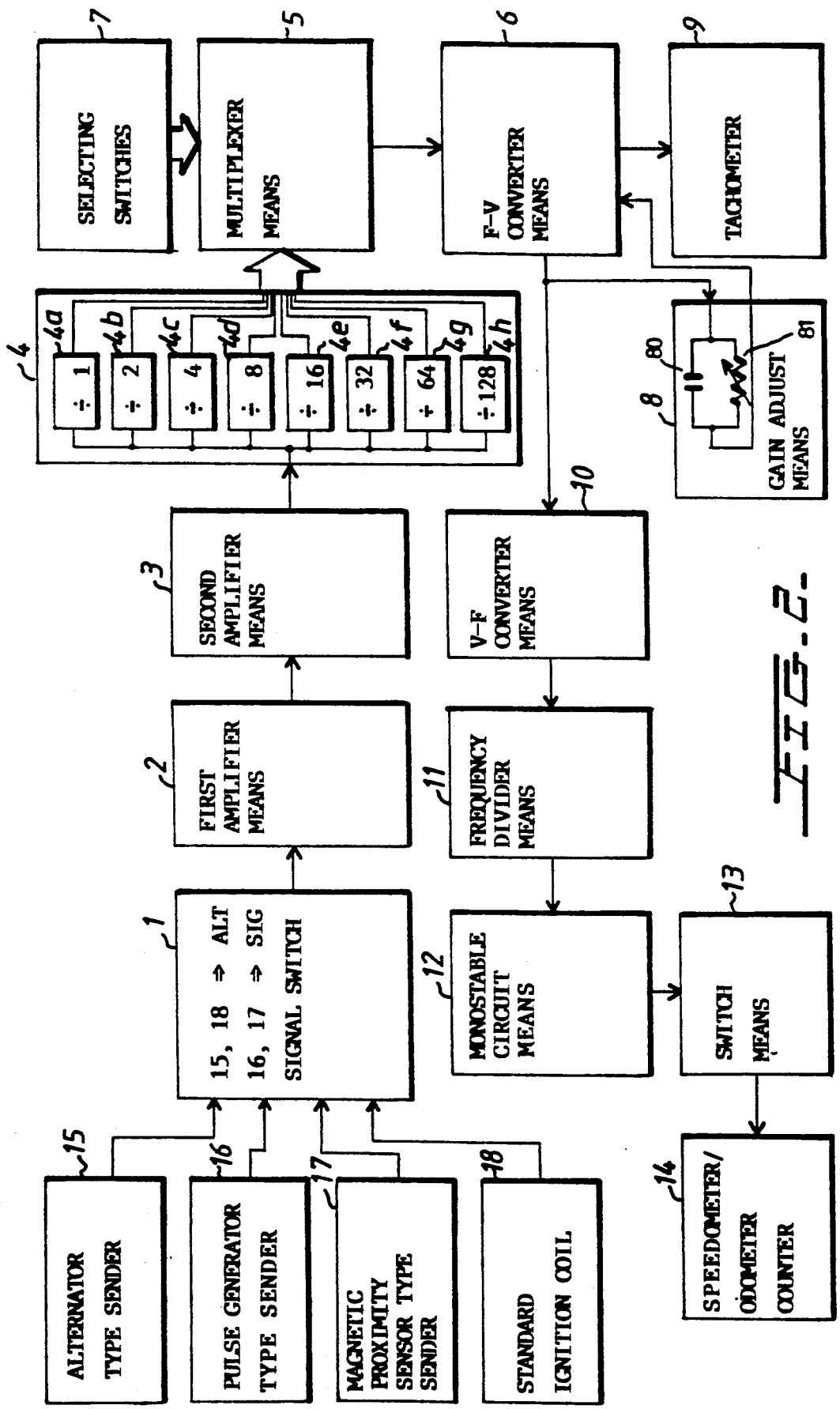
FIG. 2 is a block diagram of a wide-band programmable tachometer and speedometer/odometer apparatus in accordance with the present invention.
Figure 3:
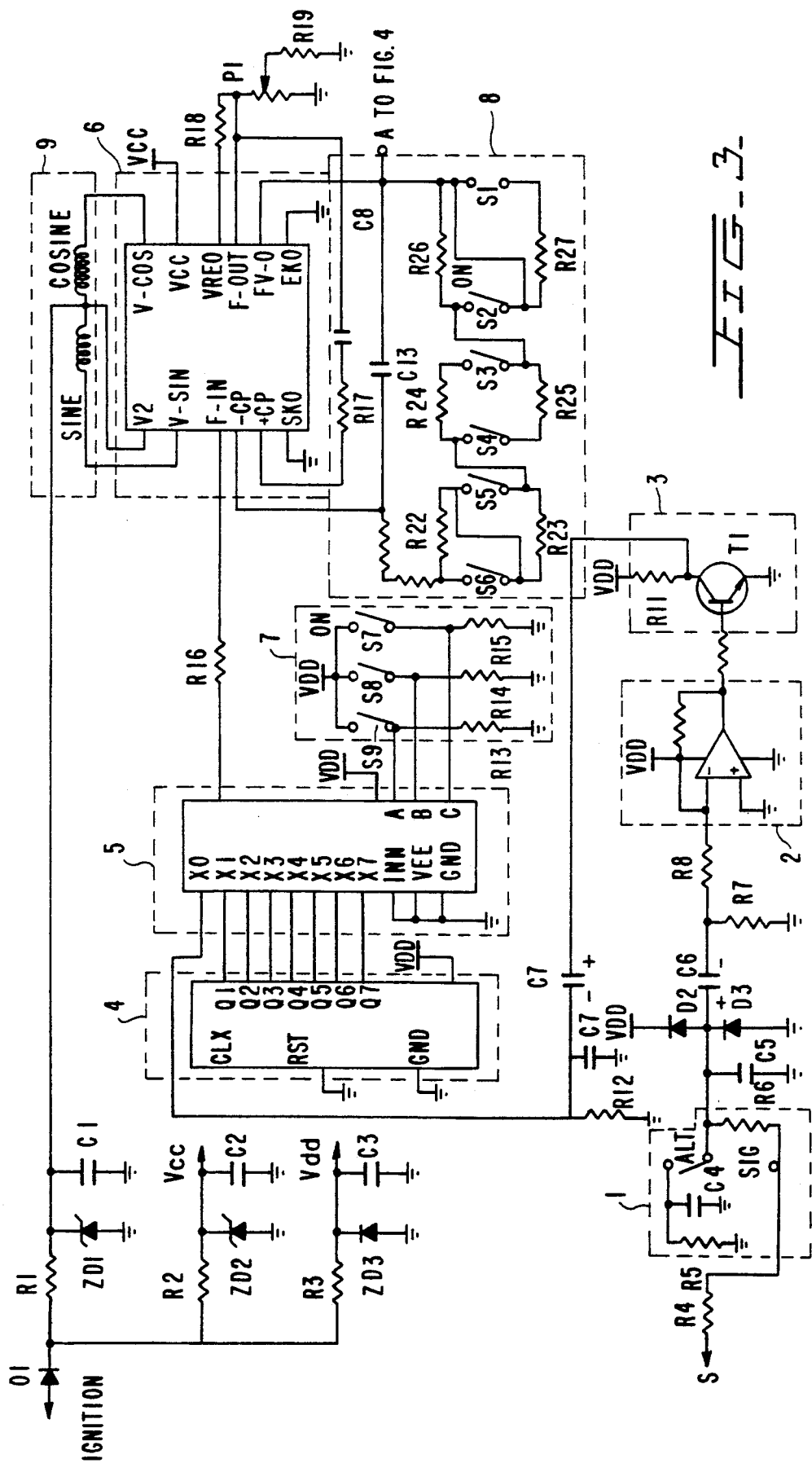
FIG. 3 is a circuit diagram of the meter of FIG. 2.
Figure 4:
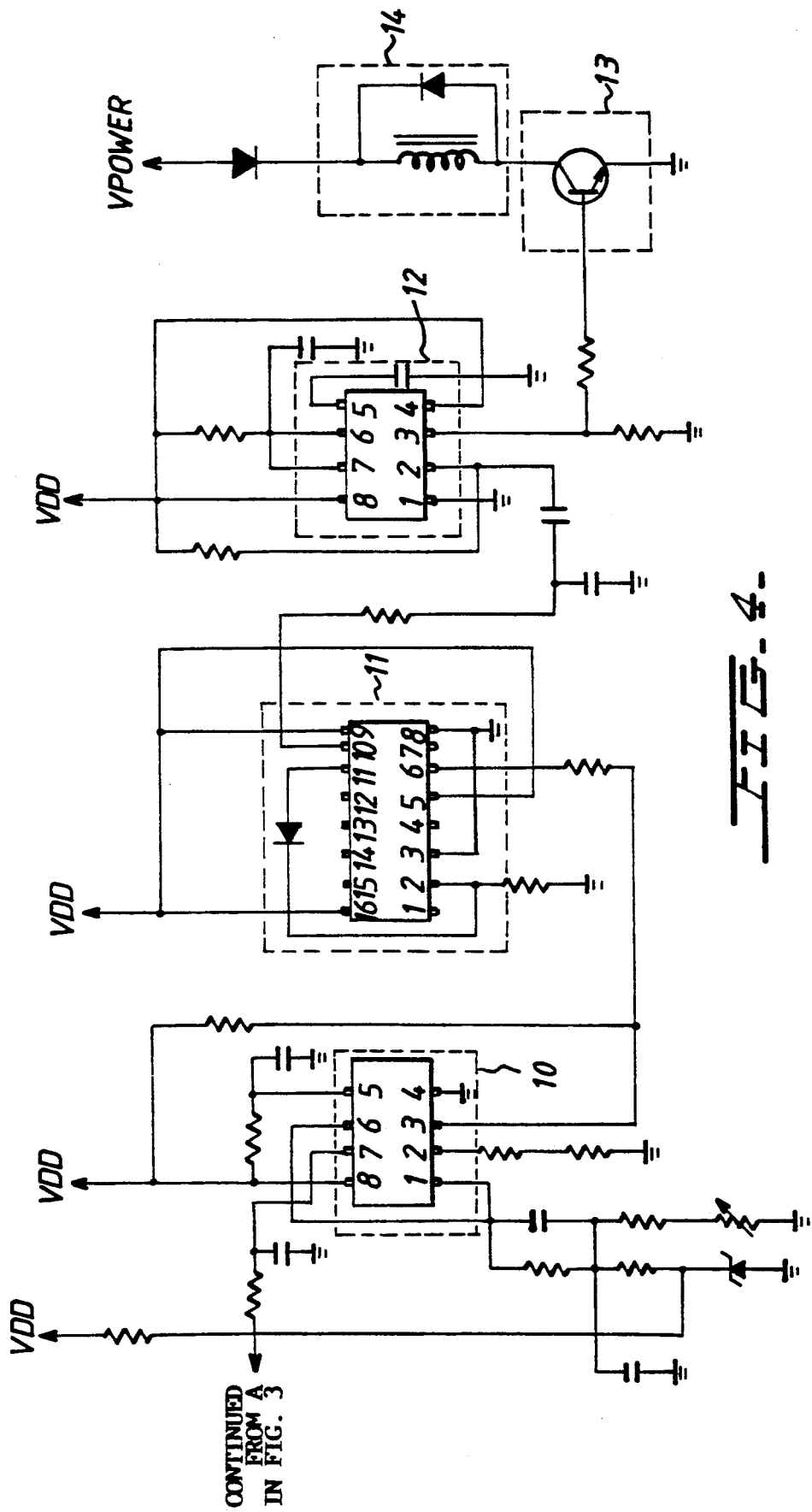
FIG. 4 is a circuit diagram of the meter continued from FIG. 3.

With reference to the drawings and in particular to FIGS. 2, 3, and 4 thereof, it is known that the rotational speed of an engine is a mechanical signal which can be converted into an electrical signal by a sensor/converter. Referring to FIGS. 2 and 3, an a pulse generator-type sender 16 and a magnetic proximity sensor type sender 17 are high frequency (1.24 kHz to 33.5 kHz) sensors and as an alternator-type sender 15 and a standard ignition coil 18 are low frequency (133 Hz to 1,240 Hz) sensors, the user has to know which kind of sensor he is using so as to utilize the meter of the present invention properly. (The descriptions of the above components are not included in the scope of this invention.)

Referring to FIGS. 2 and 3, an electrical signal treated as an input signal S is sent to a signal switch 1 of this invention. If the signal S is a high frequency signal, then the signal switch, will let the signal S pass, and if the input signal is a low frequency signal S, then the signal switch 1 will send the signal S through an RC filter so that the signal S that passes must have frequency below 1,240 Hz.

The electrical signal from the signal switch 1 is amplified by a first amplifier 2 and a second amplifier 3. The first amplifier 2 is a wide frequency band operational amplifier, while the second amplifier 3 is an NPN transistor. After the signal level is amplified, the electrical signal from the second amplifier 3 is sent to an input of a divider means 4. The divider means 4 includes eight dividers 4a, 4b, 4c, 4d, 4e, 4f, 4g, and 4h, each respectively corresponding to a division number 1, 2, 4, 8, 16, 32, 64, and 128. The frequency of the electrical signal is divided by the dividers respectively (for example, the frequency of the electrical signal is divided by 1, 2, 4, 8, 16, 32, 64, and 128) and the quotients from each divider 4a, 4b, 4c, 4d, 4e, 4f, 4g, and 4h are sent to respective inputs of a multiplexer 5, and a specific input thereof is engaged to an output of the multiplexer 5 by means of a selecting means 7. Referring to FIG. 3, the selecting means 7 comprises three switches S7, S8, and S9, each of which can be set in either an ON or an OFF state, and generates a selecting state for engaging a corresponding input of the multiplexer 5 to the output thereof.

Figure 5A:
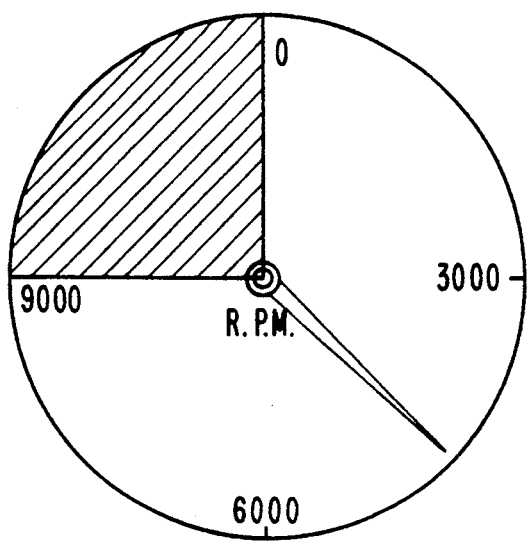
FIGS. 5a and 5b illustrate the scales of the tachometer with respect to high and low frequencies in accordance with the present invention.
Figure 5B:
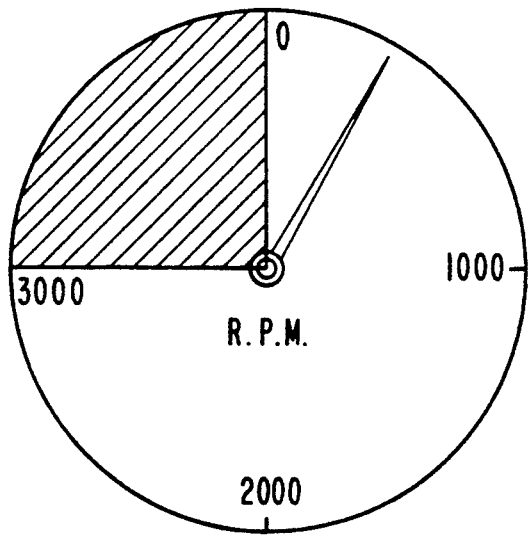

Referring to FIG. 3, the output signal from the multiplexer 5 then is sent to an F-V (frequency to voltage) converter means 6 and processed thereby to output three DC voltages from three terminals of the F-V converter means 6. A first and second DC voltage respectively from terminals V-SIN and V-COS of the F-V converter means 6 are used to drive an aircore tachometer 9. A third DC voltage from terminal FV-O is sent to a V-F (voltage to frequency) converter means 10 (see FIG. 4). Referring to FIG. 2, a gain adjust means 8 comprises a capacitor 80 and a variable resistor 81 to adjust the operating range of the tachometer 9. Referring to FIG. 3, the resistance of the variable resistor 81 is controlled by six switches S1, S2, S3, S4, S5, and S6 From ON/OFF of each switch occurs $2^6$ (64) different combinations. The frequency of the engine is shown on the tachometer 9, as shown in FIGS. 5a and 5b.

Referring to FIG. 4, the V-F converter means 10 receives a DC voltage from terminal FV-O of the F-V converter means 6 and converts the DC voltage to a pulse train with a frequency directly proportional to the DC voltage.

A frequency divider means 11 is connected to the V-F converter 10 for dividing the pulse train therefrom by $2^{18}$ and outputs a pulse signal to a monostable circuit means 12.

The monostable circuit means 12 is connected to the frequency divider means 11 and, upon receiving a negative trigger of a positive pulse, will send a pulse to a switch means 13.

The switch means 13 is an NPN transistor with a base connected to the monostable circuit means 12, an emitter connected to ground, and a collector connected to an odometer counter 14. The switch means 13 is turned on by the positive pulse signal from the monostable circuit means 12, and is turned off at the falling edge of the positive signal, thereby sending a stable pulse to the odometer counter 14.

The odometer counter 14 counts the frequency of the pulse from output of the switch means 13 to obtain the mileage of the vehicle. For example, if the odometer counter 14 counts once for each 0.1 mile and for each mile needs 6,000 pulses, then when the speed is 60 mph, the odometer counter 14 will count 600 times in one hour, and correspondingly, each count will take 6 seconds. The frequency of electrical signal S (see FIG. 3) is $$\frac{6000 \text{ pulse/mile} * 60 \text{ mile/hour}}{3600 \text{ sec/hour}} = 100 \text{Hz}$$

The V-F converter means 10 will output a pulse with a frequency of $$2^{19}/2T = 2^{19}/(2*6) = 43.7 \text{ kHz}$$

(where T=6 sec/count).

Referring to FIG. 3, when using the meter in the present invention, the user must estimate the possible range of the rotational speed of the engine to be tested in advance and manually pre-set the switches S7, S8, and S9 to correspond to one of the dividers (4a, 4b, 4c, 4d, 4e, 4f, 4g, and 4h) to be engaged with the output of multiplexer 5. Additionally, the user has to set the other switches S1, S2, S3, S4, S5, and S6 in the gain adjust means 8 so that the resulting display in both the aircore tachometer 9 and the speedometer/odmeter counter 14 (see FIG. 4) are in as easily readable manner.

Referring to FIG. 3, the setting of the above switches S1, S2, S3, S4, S5, S6, S7, S8, and S9 can be in reference to an attached table. Therefore, this invention is adapted to indicate an extremely wide range of frequencies of a tachometer. For example, if the frequency of the electrical signal from second amplifier means 3 is 150 Hz, then an input X0 of the multiplexer 5 is allowed to engage with the output thereof. If the frequency is 3,200 Hz, then an input X4 of the multiplexer 5 is allowed to be engaged with the output thereof, so that the multiplexer 5 gives a resulting signal of 200 Hz (3,200/16) into the F-V converter 6. Thus, with a suitable selection of the dividers (4a, 4b, 4c, 4d, 4e, 4f, 4g, and 4h) by means of the selecting means 7, the signal sent to the F-V converter 6 always falls in the operable range (133 Hz to 265 Hz) thereof.

As various possible embodiments might be made of the above invention without departing for the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A wide-band programmable tachometer and speedometer/odometer apparatus to detect the rotational speed of an output shaft of an engine in a vehicle and to calculate the corresponding speed/mileage thereof, comprising:

a sensor means for converting a mechanical motion of said engine into an electrical signal;

a signal frequency selecting means for adjusting said tachometer and speedometer/odometer apparatus to be used for either a high frequency (1.25 kHz to 33.5 kHz) or a low frequency (133 Hz to 1,248 Hz) engine;

a first amplifier for amplifying said signal from the output of said signal frequency selecting means;

a second amplifier connected to an output terminal of said first amplifier for amplifying a second time signal from said first amplifier;

a divider means receiving said signal from said second amplifier and dividing a frequency of said signal and outputting a plurality of signals with different frequencies;

a multiplexer means for selecting one of said different frequency signals;

a selecting means with a plurality of switches incorporated with said multiplexer means to enable only one of said different frequency signals outputted from said multiplexer means;

an F-V (frequency to voltage) converter converting said signal outputted from said multiplexer to a first DC voltage, a second DC voltage, and a third DC voltage;

a gain adjust means incorporated with said F-V converter for adjusting said first, second, and third DC voltages to be in an acceptable range;

a tachometer connected to said F-V converter and driven by said first and second DC voltages therefrom;

a V-F (voltage to frequency) converter for converting said third DC voltage from said F-V converter to a pulse signal;

a frequency divider means for dividing said pulse signal from said V-F converter and outputting a low frequency pulse;

a monostable circuit means for receiving said low frequency pulse and outputting a positive pulse;

a switch means for receiving said positive pulse as a control signal to switch ON;

an speedometer/odometer converter connected to said switch means and counting once for each switch ON.

2. A wide-band programmable tachometer and speedometer/odometer apparatus as set forth in claim 1, wherein said divider means has a plurality of dividers, each corresponding to a different respective divisor n to carry out a "divide-by-n" function of the frequency of said electrical signal.

3. A wide-band programmable tachometer and speedometer/odometer apparatus as set forth in claim 1, wherein said multiplexer means has a plurality of inputs and one output, said inputs correspond to and are respectively connected to said dividers, with one of said inputs connected to said output of said multiplexer means by control of said selecting means.

4. A wide-band programmable tachometer and speedometer/odometer apparatus as set forth in claim 1, wherein said selecting means has a plurality of switches, and by an ON/OFF state of said switches, generates a control code to engage a specific said input of said multiplexer means to the output thereof.

5. A wide-band programmable tachometer and speedometer/odometer apparatus as set forth in claim 1, wherein said F-V converter means is connected to said output of said multiplexer means and drives said tachometer to show rotational speed of said engine.

6. A wide-band programmable tachometer and speedometer/odometer apparatus as set forth in claim 1, wherein said gain adjust means is operatively connected to said F-V converter means for controlling the value of said first, second, and third DC voltages of said F-V converter.

7. A wide-band programmable tachometer and speedometer/odometer apparatus as set forth in claim 1, wherein said gain adjust means comprises a capacitor and a variable resistor, said variable resistor comprises a plurality of resistors and switches, and by said ON/OFF state of said switches, determines the resistance of said variable resistor and further adjusts an RC constant of said gain adjust means.

* * * * *